US012575588B2

(12) United States Patent
Scherer

(10) Patent No.: US 12,575,588 B2
(45) Date of Patent: Mar. 17, 2026

(54) NATURAL PET CHEW PRODUCT AND METHOD OF MANUFACTURE

(71) Applicant: Heather Scherer, Cornelius, NC (US)

(72) Inventor: Heather Scherer, Cornelius, NC (US)

( * ) Notice: Subject to any disclaimer, the term of this patent is extended or adjusted under 35 U.S.C. 154(b) by 251 days.

(21) Appl. No.: 18/337,468

(22) Filed: Jun. 20, 2023

(65) Prior Publication Data

US 2024/0196934 A1 Jun. 20, 2024

Related U.S. Application Data

(60) Provisional application No. 63/432,846, filed on Dec. 15, 2022.

(51) Int. Cl.
| | |
|---|---|
| *A23K 50/40* | (2016.01) |
| *A21D 2/34* | (2006.01) |
| *A21D 2/36* | (2006.01) |
| *A21D 13/80* | (2017.01) |

(52) U.S. Cl.
CPC .............. *A23K 50/40* (2016.05); *A21D 2/34* (2013.01); *A21D 2/36* (2013.01); *A21D 13/80* (2017.01)

(58) Field of Classification Search
CPC . A23K 50/40; A21D 2/34; A21D 2/36; A21D 13/80
See application file for complete search history.

(56) References Cited

U.S. PATENT DOCUMENTS

| | | | |
|---|---|---|---|
| 4,904,495 A | 2/1990 | Spanier | |
| 7,914,835 B2 | 3/2011 | Keehn | |
| 7,977,319 B1 * | 7/2011 | Levine | .................... A23L 33/22 |
| | | | 426/615 |
| D645,640 S | 9/2011 | Mingyun | |
| 10,842,170 B2 | 11/2020 | Kreamer | |
| 2003/0138528 A1 | 7/2003 | Hague | |
| 2006/0233923 A1 * | 10/2006 | Campbell | .............. A23K 10/20 |
| | | | 426/128 |

OTHER PUBLICATIONS

Bread "Bread Machines for Dog Treats" Dec. 1, 2021 https://best-dog-treat-recipes.com/how-make-dog-treats/bread-machines-dog-treats/ pp. 1-11 (Year: 2021).*

(Continued)

*Primary Examiner* — Kelly J Bekker
(74) *Attorney, Agent, or Firm* — Brennan, Manna & Diamond, LLC

(57) ABSTRACT

The present invention relates to natural and organic treats/snacks and methods of manufacturing such treats/snacks. The treats/snacks can be in any desired shape and are devoid of synthetic and artificial filler ingredients. More specifically, the treats/snacks include ripe bananas, peanut butter, whole wheat flour, flaxseed, honey, and egg wherein all the ingredients can be formed into a dough. The dough can then be formed into desired shapes of dough by using molds for baking in an oven at about 350 degrees for about 20 to 30 minutes to bake and form the treat/snack. The resultant treat/snack is soft to chew and easy to digest, ensuring pets can retain a healthy diet while consuming the treats/snacks. The treats/snacks can be available in different sizes and packaging and are suitable for pets of all ages and breeds.

16 Claims, 3 Drawing Sheets

(56)          References Cited

OTHER PUBLICATIONS

Igoe et al Dictionary of Food Ingredients 4th Edition, Aspen Publishing 2001, pp. 51 and 72 (Year: 2001).*
Kiszka, Leslie "Why You Mix Dry and Wet Ingredients Separately" https://stressbaking.com/why-you-mix-dry-and-wet-ingredients-separately/ pp. 1-10, Jun. 25, 2021 (Year: 2021).*
Margaret "Cooking with Kids: Homemade Dog Biscuits" https://www.kitchenfrau.com/homemade-dog-biscuits/, pp. 1-21, Oct. 12, 2021 (Year: 2021).*
Wiggle Worthy 2 "How to Store Homemade Dog Treats" https://www.wiggleworthy.com/store-homemade-dog-treats.html pp. 1-7, Jun. 23, 2021 (Year: 2021).*
Wiggle Worthy "Peanut Butter, Blueberry & Banana Dog Treats" https://www.wiggleworthy.com/peanut-butter-blueberry-banana-dog-treats.html pp. 1-2, Oct. 28, 2021 (Year: 2021).*

* cited by examiner

| Ingredients | | Quantity |
|---|---|---|
| Smashed bananas | 202 | Two |
| Peanut butter | 204 | 1 cup (7.1 oz) |
| Organic honey | 206 | 1 tablespoon (0.5 oz) |
| Egg | 208 | One |
| Flax seed | 210 | 1 cup (7.1 oz) |
| Whole wheat flour | 212 | 1 cup (7.1 oz) |

FIG. 2

NATURAL PET CHEW PRODUCT AND METHOD OF MANUFACTURE

CROSS-REFERENCE TO RELATED APPLICATION

The present application claims priority to, and the benefit of, U.S. Provisional Application No. 63/432,846, which was filed on Dec. 15, 2022, and is incorporated herein by reference in its entirety.

FIELD OF THE INVENTION

The present invention relates generally to the field of pet chew products and pet treats/snacks. More specifically, the present invention relates to a natural and organic pet treat/snack for dogs and cats. The pet treat/snack is made of natural ingredients for providing adequate nutrition without worry of harmful and synthetic composition. The treat/snack is soft to chew and easy to digest and is made of ripe bananas, peanut butter, whole wheat flour, flaxseed, honey, and egg. The treat/snack can come in different shapes and eliminates boring store-bought treats/snacks that often contain artificial ingredients and flavors. Accordingly, the present disclosure makes specific reference thereto. Nonetheless, it is to be appreciated that aspects of the present invention are also equally applicable to other like applications, devices, and methods of manufacture.

BACKGROUND

By way of background, pet treats/snacks are dietary supplements given to cats and dogs just like human food snacks. Treats/snacks not only provide nutrition, but are an invaluable training tool, and they also play a huge role in forging a bond between pet and pet owner. Normally, pets eat store-bought pet treats/snacks which is enjoyable for pets, however, they contain harmful chemicals and preservatives. Such treats/snacks may also be high in sugar and calories, which can lead to weight gain. In addition, store-bought treats/snacks may not provide the nutrients that dogs need for optimal health. Further, pets may get bored of such treats/snacks after some time.

Synthetic preservatives such as Ethoxyquin, Sodium metabisulphite, and more are commonly found in such treats/snacks and a few health-related issues that have been linked to synthetic preservatives in dog treats/snacks including, for example, liver damage, cancer, cell damage, damage to the circulatory and nervous systems, and even poisoning. Artificial treats/snacks also contain non-nutritional and cheap filler ingredients that are put into dog treats/snacks to 'bulk up' the treats/snacks. Such filler ingredients can lead to bloat, food allergies, digestive problems, and diarrhea. Refined sugars and artificial sweeteners are added to dog treats/snacks to make them more appealing for dogs. However, refined sugar is not a natural or healthy part of a dog's diet. As a result, it becomes difficult for pet owners to maintain the health of their pets, and subsequently, pet owners may suffer monetary loss and grief from repeated visits to veterinary doctors.

Conventional treats/snacks for dogs and cats are not freshly baked and may become stale and tasteless after a period of time. Sometimes, the treats/snacks may become hard and difficult to digest. Pet owners desire improved treats/snacks to overcome the mentioned shortcomings of conventional (i.e., store bought) dog and cat treats/snacks.

Therefore, there exists a long-felt need in the art for healthy and natural treats/snacks for dogs and cats. There is also a long-felt need in the art for improved dog and cat treats/snacks that contain natural ingredients for maintaining the health of pets. Additionally, there is a long-felt need in the art for pet treats/snacks that are fresh oven baked and are soft to chew. Moreover, there is a long-felt need in the art for natural treats/snacks for dogs and cats that eliminate boring store-bought treats/snacks that often contain artificial ingredients and flavors. Further, there is a long-felt need in the art for pet treats/snacks that are healthy and do not contain synthetic ingredients (i.e., sugar). Finally, there is a long-felt need in the art for improved pet treats/snacks that contain natural ingredients and ensure pets can retain a healthy diet while consuming the aforesaid treats/snacks.

The subject matter disclosed and claimed herein, in one embodiment thereof, comprises an edible pet chew. The pet chew is natural, organic, and soft. The pet chew comprising ingredients including ripe bananas, peanut butter, whole wheat flour, flaxseeds, honey, and egg; wherein a dough is prepared by mixing the ingredients. The ingredients are mixed thoroughly and uniformly to have a dough-like texture and the dough is transformed into different pet treat/snack shapes using pre-configured shaped structures. The treats/snacks are baked in the oven at about 350 degrees from about 20 to 30 minutes for making soft, chewable, and easy to digest edible pet treats/snacks.

In this manner, the prepared healthy dog and cat treat/snack of the present invention accomplishes all of the forgoing objectives and provides pet owners with healthy prepared treats/snacks for their dogs and cats. The treat/snack is made of natural and healthy ingredients which are easy to chew and digest and ensure pets can retain a healthy diet while consuming the aforesaid treats/snacks. The treats/snacks obviate health hazards caused by store-bought artificial treats/snacks.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an edible pet treat/snack. The pet treat/snack is chewable and comprises ingredients including ripe bananas, peanut butter, whole wheat flour, flaxseeds, honey, and egg; wherein a dough is prepared by mixing the ingredients and the dough is transformed into different pet treat/snack shapes. The treats/snacks are baked in the oven at about 350 degrees from about 20 to 30 minutes for making soft, chewable, and easy to digest edible pet treats/snacks.

In a further embodiment of the present invention, a natural pet treat/snack is disclosed. The pet treats/snacks comprise a dough including, an exemplary ratio of about 2 smashed bananas, 7.1 oz peanut butter, 0.5 oz of honey, an egg. 7.1 oz flaxseeds, and 7.1 oz whole wheat flour; wherein the dough is shaped into desired treat/snack shapes and the shapes are baked in an oven at about 350 degrees from about 20 to 30 minutes.

In a further embodiment of the present invention, the pet treat/snack is an edible pet chew and contains from about 2% to about 5% moisture by weight.

In a further embodiment of the present invention, a method of manufacturing pet chew product is described. The method comprising the steps of making a cream of smashed ripe bananas, natural peanut butter, and honey; adding an egg and flaxseeds in the cream; adding whole wheat flour to make a dough; making a plurality of pet treat/snack shapes from the dough; and baking the pet treat/snack shapes in an oven at about 350 degrees from about 20 to 30 minutes.

In a further embodiment of the present invention, a method of manufacturing pet chew product is described. The method comprising the steps of making a dough of smashed ripe bananas, natural peanut butter, and honey, an egg and flaxseeds in the cream, and whole wheat flour; making a plurality of pet treat/snack shapes by placing a portion of dough into a mold; freezing the pet treat/snack shapes to make them hard and to attain from about 2% to about 5% moisture by weight; and baking the pet treat/snack shapes in an oven at about 350 degrees from about 20 to 30 minutes.

In yet another embodiment, the pet treat/snack shape can be one of a bone, a toy, a flower, or any other shape known in the arts.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 2 illustrates a table showing exemplary composition of the prepared dog and cat treats/snacks of the present invention in accordance with the disclosed architecture;

DETAILED DESCRIPTION OF THE PRESENT INVENTION

Figure 1:
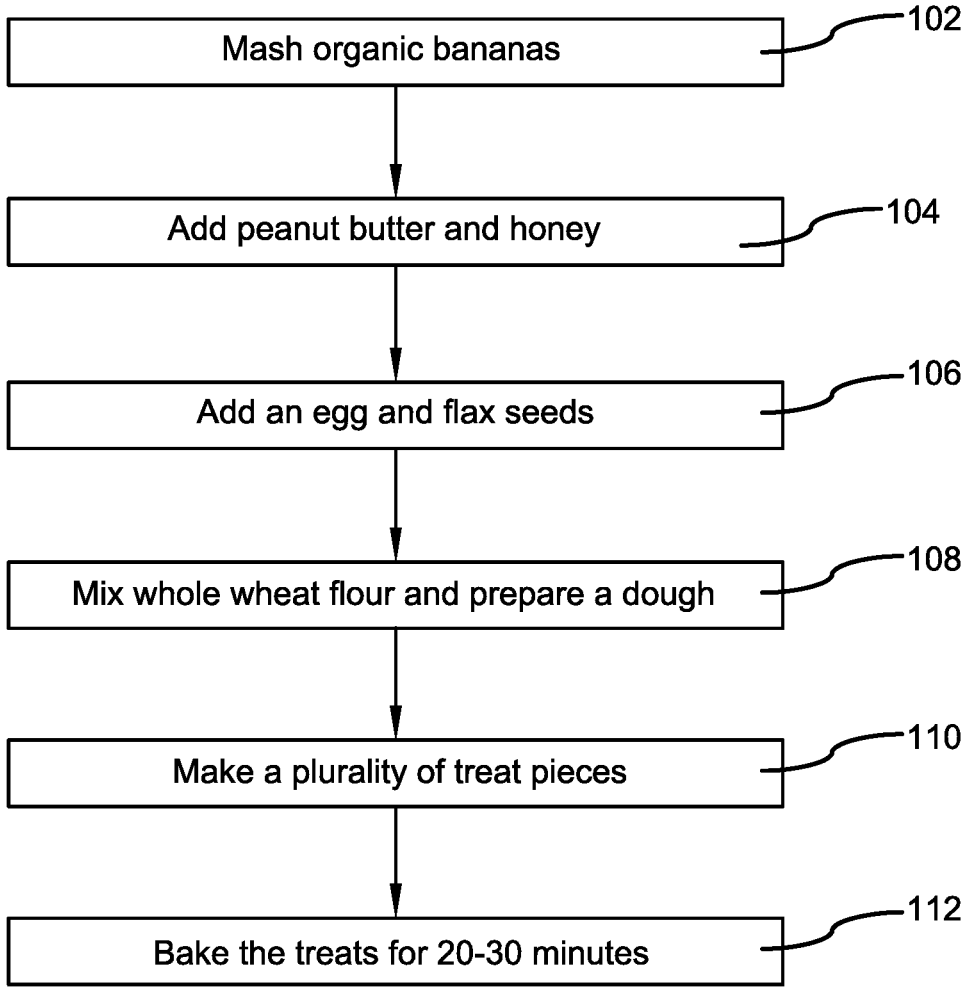
FIG. 1 illustrates a flow diagram depicting a process of preparing a healthy and natural pet treat/snack of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for healthy and natural treats/snacks for dogs and cats. There is also a long-felt need in the art for improved dog and cat treats/snacks that contain natural ingredients for maintaining the health of pets. Additionally, there is a long-felt need in the art for pet treats/snacks that are fresh, oven baked, and soft to chew. Moreover, there is a long-felt need in the art for natural treats/snacks for dogs and cats that obviate boring store-bought treats/snacks that often contain artificial ingredients and artificial flavorings. Further, there is a long-felt need in the art for pet treats/snacks that are healthy, and that are sans synthetic ingredients and sans sugar. Finally, there is a long-felt need in the art for improved pet treats/snacks that contain natural ingredients and ensure pets can retain a healthy diet while still consuming treats/snacks.

The present invention, in one exemplary embodiment, is a method of manufacturing a pet chew product. The method comprising the steps of making a uniform and soft dough of smashed ripe bananas, natural peanut butter, and honey, an egg and flaxseeds in the cream, and whole wheat flour; making a plurality of pet treat/snack shapes from the dough; freezing the pet treat/snack shapes to make them hard and to attain from about 2% to about 5% moisture by weight; and, baking the pet treat/snack shapes in an oven at about 350 degrees for about 20 to 30 minutes.

Referring initially to the drawings, FIG. 1 illustrates a flow diagram depicting a process of preparing healthy and natural pet treats/snacks 100 of the present invention in accordance with the disclosed architecture. Initially, organic bananas are mashed using a mechanical or electronic banana masher (Step 102). Then, peanut butter and honey are mixed in the mashed banana for creating a thick cream (Step 104). Thereafter, an egg is added to the cream and a plurality of flaxseeds are added therein (Step 106). For preparing a dough using the mixture prepared in the earlier steps, whole wheat flour is mixed into the dough for about five to ten minutes until a smooth and uniform dough is prepared (Step 108). The dough can be prepared mechanically by a user on a small scale or can be prepared by a dough maker machine.

As per preferences of users, treats/snacks of desired shapes can be made using structures or molds of different shapes and rolling of the dough (Step 110). Finally, the treats/snacks are immediately baked in the oven at about 350 degrees for about 20 to 30 minutes until the treats/snacks become golden in texture (Step 112). In cases where the fresh treats/snacks are soft, they can be frozen before performing baking of the treats/snacks. It should be noted that all the ingredients used in making the treats/snacks are organic, natural, and gourmet, and are suitable for pets of all ages and breeds.

Intense heating is not used in making the treats/snacks and thus, vitamins, minerals, and amino acids are preserved in the treats/snacks. The aroma, color, and texture of the treats/snacks 100 are derived from high-quality raw materials and are devoid of synthetic colors, artificial flavors, and preservatives. Treats/snacks can be shaped into bones, toys, flowers, or any other shape.

FIG. 2 illustrates a table showing an exemplary ratio composition of the prepared dog and cat treats/snacks 100 of the present invention in accordance with the disclosed architecture. For preparing about 500 grams (17.64 oz) of treats/snacks 100, two smashed bananas 202 can be used. The bananas are high in potassium, vitamin B6, and vitamin C and provide adequate nutrition to pets. One cup (7.1 oz) of peanut butter 204 and one tablespoon (0.5 oz) of honey 206 are used for forming the thick cream. The peanut butter 204 is organic, pet-safe, and does not contain xylitol. Honey 206 is safe for pets and contains natural sugars and small amounts of vitamins and minerals.

One egg 208 is added to cream the mixture. The egg is high in protein, fatty acids, and vitamins which assists and supports pets to maintain adequate nutrition and energy. One cup (7.1 oz) flaxseed 210 is added to the mixture for boosting a pet's immune system. In fact, flaxseed oil contains alpha-linolenic acid (ALA), which breaks down into two antioxidants—eicosapentaenoic acid (EPA) and docosahexaenoic acid (DHA) in the pet's body. Both EPA and DHA are chemicals that can help boost pet's immune system, improve their skin, and maintain their coat of fur. One cup (7.1 oz) whole wheat flour 212 can be used for preparing a dough containing all the natural ingredients wherein the wheat flour 212 also adds fiber, protein, vitamins, and minerals to the treats/snacks 100.

Figures 3A, 3B:
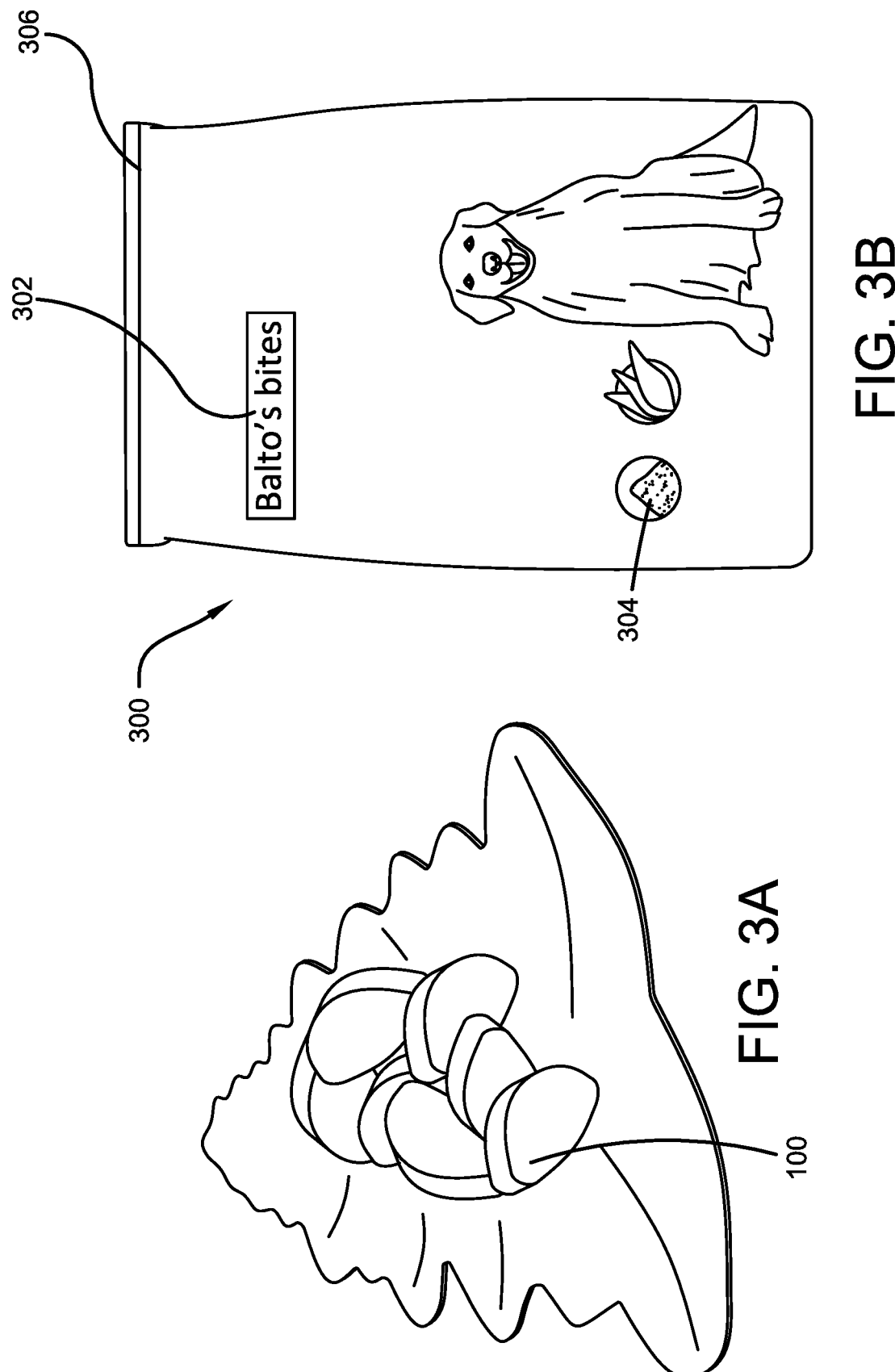
FIG. 3A illustrates a perspective view of one potential embodiment of the natural pet treat/snack of the present invention in accordance with the disclosed architecture.
FIG. 3B illustrates an exemplary packaging available commercially for the pet treats/snacks of the present invention in accordance with the disclosed architecture.

FIG. 3A illustrates a perspective view of one potential embodiment of the natural pet treats/snacks 100 of the present invention in accordance with the disclosed architecture. The natural treats/snacks 100 can be made in any shape, size, and design based on the preferences and requirements of a user by using molds of different shapes. The treats/snacks 100 are freshly baked and have a shelf life of around one month, thereby providing effective nutrition to pets.

FIG. 3B illustrates an exemplary packaging available commercially for pet treats/snacks for the present invention in accordance with the disclosed architecture. The treats/snacks 100 can be available in different packaging ranging from about 5 oz to about 20 oz to meet requirements of different users. As illustrated, the packaging 300 includes a brand name 302 such as "Belto's bites" and logos/pictures 304 of different ingredients of the treat/snack 100. In some embodiments, calories and nutrition offered by the treats/snacks are also indicated on the packaging 300. The packaging 300 can have a safety means such as a zipper or a fastener 306 for preserving the treats/snacks 100.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "healthy and natural pet treats/snacks", "edible pet treat/snack", "natural pet treat/snack", "edible pet chew", "treat/snack", and "natural pet chew" are interchangeable and refer to the healthy and natural pet treat/snack 100 of the present invention.

Notwithstanding the forgoing, the healthy and natural pet treat/snack 100 of the present invention can be of any suitable size and configuration as is known in the art without affecting the overall concept of the invention, provided that it accomplishes the above stated objectives. One of ordinary skill in the art will appreciate that the healthy and natural pet treat/snack 100 as shown in the FIGS. and the steps of making the treats/snacks are for illustrative purposes only, and that many other sizes and shapes and steps for the healthy and natural pet treat/snack 100 are well within the scope of the present disclosure. Although the dimensions and configuration of the healthy and natural pet treat/snack 100 are important parameters for user convenience, the healthy and natural pet treat/snack 100 may be of any size and can contain any additional natural and organic ingredients that ensure optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of making pet snacks, the method comprising the steps of:
   combining mashed bananas, peanut butter, and honey;
   mixing said bananas, said peanut butter and said honey to form a cream;
   adding an egg and flaxseed to said cream;
   mixing said eggs and said flaxseed with said cream;
   adding flour to said cream;
   mixing said flour with said cream to form a dough;
   rolling said dough;
   freezing said dough prior to said baking of said dough to achieve a moisture level of between 2-5% by weight; and
   baking said dough for 30 minutes.

2. The method of making pet snacks of claim 1, wherein said flour is wheat flour.

3. The method of making pet snacks of claim 2, wherein said wheat flour is mixed with said cream for about five to ten minutes.

4. The method of making pet snacks of claim 3, wherein said dough is prepared mechanically by a user.

5. The method of making pet snacks of claim 3, wherein said dough is prepared by a dough maker machine.

6. The method of making pet snacks of claim 4, wherein said dough is molded into a shape.

7. The method of making pet snacks of claim 1, wherein said baking of said dough is at a temperature of 350 degrees F.

8. The method of making pet snacks of claim 7, wherein said dough includes a weight ratio of 14.2 said peanut butter, 1 part said honey, and 14.2 said flaxseed.

9. The method of making pet snacks of claim 8, wherein the weight ratio of said dough includes 14.2 said flour.

10. A method of making pet snacks, the method comprising the steps of:

combining bananas, peanut butter, honey, an egg, and flaxseed;

mixing said bananas, said peanut butter, said honey, said egg, and said flaxseed to form a cream;

adding flour to said cream;

mixing said flour with said cream to form a dough;

molding the dough into dog toy shapes;

wherein said dough includes a weight ratio of 14.2 said peanut butter, 1 part said honey, 14.2 said flaxseed, and 14.2 said flour;

freezing said dough prior to said baking of said dough to achieve a moisture level of between 2-5% by weight:

baking said dough.

11. The method of making pet snacks of claim 10, wherein said flour is wheat flour.

12. The method of making pet snacks of claim 10, wherein said flour is mixed with said cream for about five to ten minutes.

13. The method of making pet snacks of claim 10, wherein said dough is prepared mechanically by a user.

14. The method of making pet snacks of claim 10, wherein said dough is prepared by a dough maker machine.

15. The method of making pet snacks of claim 10, wherein said baking of said dough is at a temperature of 350 degrees E.

16. The method of making pet snacks of claim 10, wherein said baking of said dough is from about 20 to 30 minutes.

\* \* \* \* \*